(12) United States Patent
Yu

(10) Patent No.: US 8,654,647 B2
(45) Date of Patent: Feb. 18, 2014

(54) METHOD AND SYSTEM FOR COMMUNICATION CAPACITY NEGOTIATION OF PHYSICAL LAYER CHIPS

(75) Inventor: Yang Yu, Zhejiang (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 241 days.

(21) Appl. No.: 13/119,888

(22) PCT Filed: Sep. 8, 2009

(86) PCT No.: PCT/CN2009/073809
§ 371 (c)(1),
(2), (4) Date: Apr. 14, 2011

(87) PCT Pub. No.: WO2010/031313
PCT Pub. Date: Mar. 25, 2010

(65) Prior Publication Data
US 2011/0188519 A1    Aug. 4, 2011

(30) Foreign Application Priority Data
Sep. 18, 2008  (CN) .......................... 2008 1 0222617

(51) Int. Cl.
*H04L 12/26* (2006.01)

(52) U.S. Cl.
USPC .......................................... 370/236; 370/255

(58) Field of Classification Search
USPC .......................................... 370/236, 254, 255
See application file for complete search history.

(56) References Cited

U.S. PATENT DOCUMENTS

| | | | |
|---|---|---|---|
| 6,275,501 B1 | 8/2001 | Lucas et al. | |
| 6,356,533 B1 | 3/2002 | Bruno et al. | |
| 6,438,113 B1 * | 8/2002 | Yang et al. | 370/329 |
| 6,859,825 B1 | 2/2005 | Williams et al. | |
| 7,161,936 B1 * | 1/2007 | Barrass et al. | 370/387 |
| 7,242,693 B1 * | 7/2007 | Acharya et al. | 370/445 |
| 7,292,597 B2 * | 11/2007 | Mills et al. | 370/433 |
| 7,660,272 B1 * | 2/2010 | Lo | 370/278 |
| 8,270,434 B2 * | 9/2012 | Powell | 370/468 |
| 2002/0119783 A1 | 8/2002 | Bourlas et al. | |
| 2005/0207360 A1 * | 9/2005 | Costo et al. | 370/282 |
| 2007/0248118 A1 * | 10/2007 | Bishara et al. | 370/469 |
| 2009/0154455 A1 * | 6/2009 | Diab | 370/389 |

FOREIGN PATENT DOCUMENTS

| | | |
|---|---|---|
| CN | 1881979 | 12/2006 |
| CN | 1893420 | 1/2007 |
| CN | 101072064 | 11/2007 |
| CN | 101087204 | 12/2007 |
| CN | 101360116 A | 2/2009 |

* cited by examiner

*Primary Examiner* — Gary Mui

(57) ABSTRACT

A method for communication capacity negotiation for physical layer chips performed by a network device provided with a first physical layer chip and a second physical layer chip includes, with the first physical layer chip, negotiating communication capacity with an opposite end, and reporting the communication capacity confirmed by negotiation to the second physical layer chip; and with the second physical layer chip, adopting the communication capacity acquired from the first physical layer chip to negotiate communication capacity with another opposite end by a fixed negotiation mode. A system for communication capacity negotiation of physical layer chips includes a first physical layer chip; and a second physical layer chip. The first physical layer chip negotiates a communication capacity with an opposite end, and reports the communication capacity confirmed by negotiation to the second physical layer chip; and the second physical layer chip adopts the communication capacity acquired from the first physical layer chip to negotiate communication capacity with another opposite end by a fixed negotiation mode.

20 Claims, 3 Drawing Sheets

US 8,654,647 B2

METHOD AND SYSTEM FOR COMMUNICATION CAPACITY NEGOTIATION OF PHYSICAL LAYER CHIPS

RELATED APPLICATIONS

The present application is a national stage filing under 37 C.F.R. §1.371 and claims the priority of Patent Cooperation Treaty (PCT) Patent Application No. PCT/CN2009/073809, which, in turn claims the priority of Chinese Patent Application No. 200810222617.2, filed Sep. 18, 2008. Both previous applications are hereby incorporated by reference in their respective entireties.

BACKGROUND

Two communication devices need to perform negotiation of communication capacity of physical layers prior to the communication, the communication capacity including communication rate and communication mode. For example, the communication rate includes 10 Mbps, 100 Mbps, and 1000 Mbps, and the communication mode includes half duplex, full duplex and so on. Through negotiation, rate and mode are agreed, for example, 10 Mbps half duplex, or 100 Mbps full duplex, etc. may be negotiated. The communication capacity negotiation of physical layers is performed between the physical layers of both communication parties.

BRIEF DESCRIPTION OF THE DRAWINGS

The present specification relates to communication capacity negotiation technology in the field of communication, particularly to a method for communication capacity negotiation of physical layer chips and a system for communication capacity negotiation of physical layer chips.

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
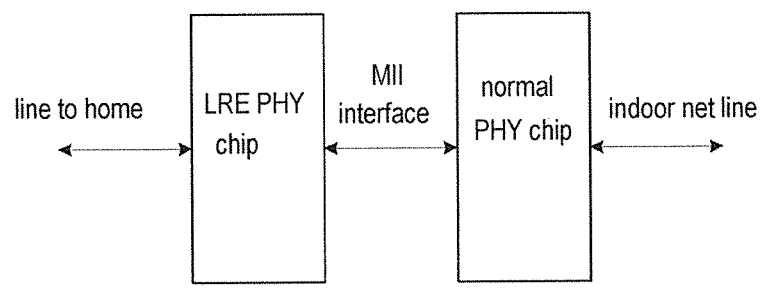
FIG. 1 is a schematic diagram of the physical layer structure of CPE in the prior art.

The negotiation of communication capacity of physical layers is rather complicated for a Long Reach Ethernet equipment. A typical Long Reach Ethernet equipment is a Customer Premises Equipment (CPE). As shown in FIG. 1, the physical layer of CPE is formed by connection of two physical layer (PHY) chips and includes a Long Reach Ethernet (LRE) PHY chip and a normal PHY chip. The LRE PHY chip supports a Long Reach Ethernet interface and is connected with the line to home, and the normal PHY chip supports a normal Ethernet interface and is connected with the network port of the indoor PC machine via the indoor net line. The LRE PHY chip and the normal PHY chip are directly connected via a Media Independent Interface (MII).

The LRE PHY chip and the normal PHY chip both need to perform negotiation of communication capacity with their respective opposite end physical layers. The opposite end physical layer of the LRE PHY chip is the PHY chip of the opposite end equipment connected via the line to home, and the opposite end physical layer of the normal PHY chip is the PHY chip of the indoor PC machine connected via the indoor net line.

The LRE PHY chip and the normal PHY chip both support such two negotiation modes as self-negotiation and fixed negotiation. Under a self-negotiation mode, the PHY chips of both communication parties perform negotiation sequentially from the maximum capacity according to their respectively supported capacities and automatically negotiate to the communication capacities that are supported by both parties. For example, for the PHY chip supporting 100 Mbps and 10 Mbps, first try to negotiate 100 Mbps full duplex, and if the two parties cannot come to an agreement, then negotiate 10 Mbps full duplex. While under a fixed negotiation mode, the PHY chip negotiates with the opposite party in accordance with a preconfigured communication capacity. For example, for the PHY chip supporting 100 Mbps and 10 Mbps, if the preconfigured communication capacity is 10 Mbps full duplex, then the PHY chip can only negotiate with the opposite party by 10 Mbps full duplex, but cannot negotiate other communication capacities.

At present, a LRE PHY chip and a normal PHY chip perform no communication therebetween. When the LRE PHY chip and the normal PHY chip respectively complete the communication capacity negotiation with their opposite ends, the communication capacities negotiated by them may be not consistent. Packet loss phenomenon may occur if the LRE PHY chip and the normal PHY chip having inconsistent communication capacities transmit data. In the prior art, such inconsistency may be solved by using the data buffer storage area of a MAC layer chip to prevent packet loss. However, no MAC layer chip exists in CPE, so the communication capacities of the LRE PHY chip and the normal PHY chip are consistent to prevent packet loss therebetween.

In this situation, one solution is that the LRE PHY chip and the normal PHY chip are configured with the same communication capacity, for example, both are configured to 10 Mbps full duplex, then the LRE PHY chip and the normal PHY chip adopt the configured fixed communication capacity respectively, to perform negotiation with their respective opposite ends by a fixed negotiation mode. However, such a mode is obviously not flexible enough. If the LRE PHY chip and the normal PHY chip adopt self-negotiation mode respectively, the LRE PHY chip and the normal PHY chip cannot be ensured to acquire the same communication capacity, because the LRE PHY chip and the normal PHY chip perform negotiations individually without mutual communications.

In view of this, a method for communication capacity negotiation of physical layer chips is provided by the present specification. This method may be applied to a network device provided with two physical layer chips and can ensure that the two physical layer chips acquire the same communication capacity.

In various examples, the present specification describes the following. The first physical layer chip negotiates communication capacity with an opposite end, and reports the communication capacity confirmed by negotiation to the second physical layer chip; and the second physical layer chip adopts the communication capacity acquired from the first physical layer chip to negotiate communication capacity with an opposite end by a fixed negotiation mode. The first physical layer chip negotiates communication capacity with another opposite end by either a fixed negotiation mode or a self-negotiation mode. In some examples, the communication capacity includes communication rate.

In some examples, the method further comprises: the speed indication output pin disposed on the first physical layer chip is connected with the speed indication input pin on the second physical layer chip; and the level of the self-negation input pin of the second physical layer chip is set as a level indicating a fixed negotiation mode; the reporting the communication capacity confirmed by negotiation to the second physical layer chip comprising: the first physical layer chip sets the level of the speed of its indication output pin as a level indicating the communication rate confirmed by negotiation; and the second physical layer chip acquires the level of the speed indication from its input pin, and confirms the communication rate based on the acquired level.

The communication capacity may further include the communication mode. In some examples, the method further comprises a communication mode indication output pin disposed on the first physical layer chip is connected with a communication mode indication input pin on the second physical layer chip; and the reporting the communication capacity confirmed by negotiation to the second physical layer chip further comprises the first physical layer chip sets the level of its communication mode indication output pin as a level indicating the communication mode confirmed by negotiation; and the second physical layer chip acquires the level from its communication mode indication input pin, and confirms the communication mode based on the acquired level.

In some examples, the first physical layer chip is a Long Reach Ethernet (LRE) physical layer chip, and the second physical layer chip is a normal physical layer chip.

A system for communication capacity negotiation of physical layer chips is further provided by the present specification, which is applied to a network device provided with two physical layer chips and can ensure that the two physical layer chips acquire the same communication capacity. In various examples, the system comprises a first physical layer chip and a second physical layer chip; the first physical layer chip is used to negotiate communication capacity with an opposite end, and to notify the communication capacity confirmed by negotiation to the second physical layer chip; the second physical layer chip is used to adopt the communication capacity acquired from the first physical layer chip to negotiate communication capacity with an opposite end by a fixed negotiation mode. The first physical layer chip negotiates communication capacity with an opposite end by either a fixed negotiation mode or a self-negotiation mode.

In some examples, the communication capacity includes communication rate. The first physical layer chip includes a speed indication output pin, and the second physical layer chip includes a speed indication input pin and a self-negotiation input pin; the speed indication output pin is connected with the speed indication input pin; and the level of the self-negotiation input pin is set as a level indicating a fixed negotiation mode.

The first physical layer chip is further used to set the level of its speed indication output pin as a level indicating the communication rate confirmed by negotiation after negotiation of communication capacity. The second physical layer chip is further used to acquire the level from its speed indication input pin, and to confirm the communication rate based on the acquired level. In some examples, the communication capacity further includes communication mode.

The first physical layer chip further comprises a communication mode indication output pin; the second physical layer chip further comprises a communication mode indication input pin; and the communication mode indication output pin is connected with the communication mode indication input pin. The first physical layer chip is further used to set the level of its communication mode indication output pin as a level indicating the communication mode confirmed by negotiation after negotiation of communication capacity. The second physical layer chip is further used to acquire the level of its communication mode indication input pin, and to confirm the communication mode based on the acquired level.

In some examples, the first physical layer chip is a Long Reach Ethernet LRE physical layer chip, and the second physical layer chip is a normal physical layer chip.

It is seen from the above technical solution that the second physical layer chip negotiates communication capacity with an opposite end of the first physical layer chip by adopting the communication rate confirmed by the first physical layer chip through negotiation to ensure that the first physical layer chip and the second physical layer chip acquire the same communication capacity.

When the first physical layer chip adopts a self-negotiation mode, the communication capacity confirmed by the first physical layer chip through negotiation may vary according to the capacity of the opposite end and adapt to the maximum communication capacity of the opposite end to the utmost extent. Furthermore, the negotiation of the first physical layer chip needs no manual configuration, so the flexibility of negotiation is improved.

In addition, the first physical layer chip and the second physical layer chip are connected through the hardware of pins to constitute a notification channel, for notifying the communication capacity confirmed by the first physical layer chip through negotiation to the second physical layer chip. It is simply implemented, and the implementing cost is reduced to a maximum degree.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an example" or similar language means that a particular feature, structure, or characteristic described in connection with that example is included in at least that one example, but not necessarily in other examples.

The present invention is a solution of communication capacity negotiation of physical layer chips, which is applied to a network device provided with a first physical layer chip and a second physical layer chip. The basic principle is: the first physical layer chip negotiates communication capacity with an opposite end, and notifies the communication capacity confirmed by negotiation to the second physical layer chip; and the second physical layer adopts the acquired communication capacity to negotiate communication capacity with an opposite end by a fixed negotiation mode.

It can be seen from the basic principle of the negotiation solution in the present invention that, the second physical layer chip negotiates communication capacity with an opposite end of the first physical layer chip by adopting the communication rate confirmed by the first physical layer chip through negotiation to ensure that the first physical layer chip and the second physical layer chip have the same communication capacity.

The first physical layer chip may either adopt a fixed negotiation mode or adopt a self-negotiation mode. When the first physical layer adopts a fixed negotiation mode, so long as the communication capacity of the first physical layer chip is confirmed, through negotiation, the second physical layer chip will certainly have the same communication capacity as the first physical layer chip, which is simpler than the mode of setting a fixed communication capacity for two physical layer chips simultaneously. If the configured communication capacity needs to be changed, it is only needed to update the configuration of one party, namely the first physical layer chip, the operation of which is much simpler as compared with the prior art where two physical layer chips need to be configured simultaneously.

When the first physical layer chip adopts a self-negotiation mode, the communication capacity confirmed by the first physical layer chip through negotiation may vary according to the capacity of the opposite end and adapt to the maximum communication capacity of the opposite end to the utmost extent, and the negotiation of the first physical layer chip needs no manual configuration, so the flexibility of negotiation is improved.

The technical solution of the present invention may be applied to a network device provided with two physical layer chips, each of which is connected with an opposite end, so it is not only needed that the two physical layer chips negotiate communication capacity with an opposite end respectively, but the communication capacities of the two physical layer chips are equal as well. The present invention may also be applied to a system constituted by the network device and two opposite ends in connection with the network device.

Taking the CPE that has a LRE PHY chip and a normal PHY chip related in the background of the invention as an example, a detailed description is given below concerning the process of the LRE PHY chip and the normal PHY chip performing communication capacity negotiation by the method for communication capacity negotiation of physical layer chips in the present invention. The LRE PHY chip is a first physical layer chip, and the normal PHY chip is a second physical layer chip. Furthermore, the LRE PHY chip negotiates communication capacity with an opposite end by self-negotiation.

Figure 2:
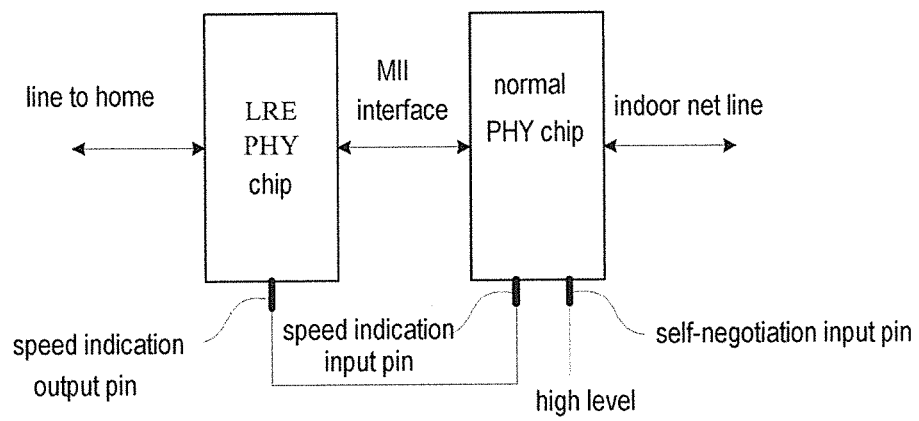
FIG. 2 is a schematic diagram of the connecting structure of the physical layer chips in an example of the principles disclosed herein.

FIG. 2 is a schematic diagram of the connecting structure of the physical layer chips in CPE in example one of the present invention. As shown in FIG. 2, the physical layer of CPE includes an LRE PHY chip and a normal PHY chip. After completion of self-negotiation, the LRE PHY chip needs to notify the communication capacity confirmed by negotiation to the normal PHY chip. Wherein, the communication capacity includes communication rate and communication mode. In this example, the LRE PHY chip adopts a full duplex communication mode fixedly, so the normal PHY chip also adopts a full duplex communication mode, then the LRE PHY chip and normal PHY chip may be preconfigured to adopt a full duplex mode, and the LRE PHY chip just only needs to notify the communication rate confirmed by negotiation to the normal PHY chip.

In order to notify the communication rate confirmed by negotiation to the normal PHY chip, referring to FIG. 2, one way of notification is to add a speed indication output pin to the LRE PHY chip. The speed indication output pin is connected with the existing speed indication input pin of the normal PHY chip, and the connection between the speed indication output pin and the speed indication input pin forms a notification channel for notifying the communication rate confirmed by negotiation to the normal PHY chip.

The LRE PHY chip indicates the rate confirmed by negotiation by applying different levels on the speed indication output pin. The number of the speed indication output pins is related to the type of the rates supported by the LRE PHY chip and the normal PHY chip. In this example, the LRE PHY chip and the normal PHY chip support two rates of 10 Mbps and 100 Mbps, then one will be enough as for the number of the speed indication output pin in the LRE PHY chip. In practice, if the LRE PHY chip and the normal PHY chip support 3-4 rates, then at least two speed indication output pins should be set in the LRE PHY chip, n speed indication output pins may distinguish $2n$ different rates, and n is a positive integer.

The normal PHY chip includes 3 existing pins associated with the communication capacity negotiation, and further includes a self-negotiation input pin and a communication mode indication input pin in addition to the above speed indication input pins. Wherein, The self-negotiation input pin is for indicating whether the current negotiation mode is a fixed negotiation mode or a self-negotiation mode. The high or low of the level of the self-negotiation input pin indicates whether the current negotiation node is a fixed negotiation mode or a self-negotiation mode. For example, if the self-negotiation input pin is of high level, it indicates that the current negotiation mode is a fixed negotiation mode, and if the self-negotiation input pin is of low level, it indicates that the current negotiation mode is a self-negotiation mode.

The speed indication input pin is for indicating what the configured fixed rate is under a fixed negotiation mode. The speed indication input pin has different levels to indicate different configured rates. The number of the speed indication input pins should be identical to that of the speed indication output pins in the LRE PHY chip, and the identical here just indicates the currently used pins, not including standby pins. In this example, the normal PHY chip supports two rates of 10 Mbps and 100 Mbps, so when the normal PHY chip uses one speed indication input pin, if the speed indication input pin is of high level, it indicates that the configured fixed rate is 100 Mbps, and if the speed indication input pin is of low level, it indicates that the configured fixed rate is 10 Mbps. In practice, when the LRE PHY chip and the normal PHY chip support 3 rates of 10/100/1000 Mbps, two speed indication input pins are used. The level combination of the two speed indication input pins may indicate 4 different rates, wherein 3 of them are used to indicate 10/100/1000 Mbps, respectively.

The communication mode indication input pin is for indicating whether the configured communication mode is full duplex or half duplex. The communication mode indication input pin has different levels to indicate different configured communication modes.

In this example one, the normal PHY chip is set as a fixed negotiation mode, so the level of the self-negotiation input pin of the normal PHY chip is set as a level indicating a fixed negotiation mode, for example, a high level. Since the rate of the normal PHY chip under fixed negotiation is provided by the LRE PHY chip, the speed indication input pin of the normal PHY chip is connected to the speed indication output pin newly added to the LRE PHY chip, to allow the rate confirmed by the LRE PHY chip through negotiation to determine the fixed negotiation rate of the normal PHY chip. In this example, since the LRE PHY chip and the normal PHY chip both perform communication by adopting a full duplex mode fixedly, the LRE PHY chip may not notify the communication mode to the normal PHY chip. In this case, the communication mode indication input pin on the normal PHY chip may connect the level indicating full duplex fixedly, or configure a normal PHY chip on the software to perform negotiation by adopting the full duplex mode.

In this example, the normal PHY chip already has the speed indication input pin, self-negotiation input pin and communication mode indication input pin. If the second physical layer chip does not have these pins, these pins can be added thereto, for example, some undefined pins in the chips may be defined as the 3 pins.

Figure 3:
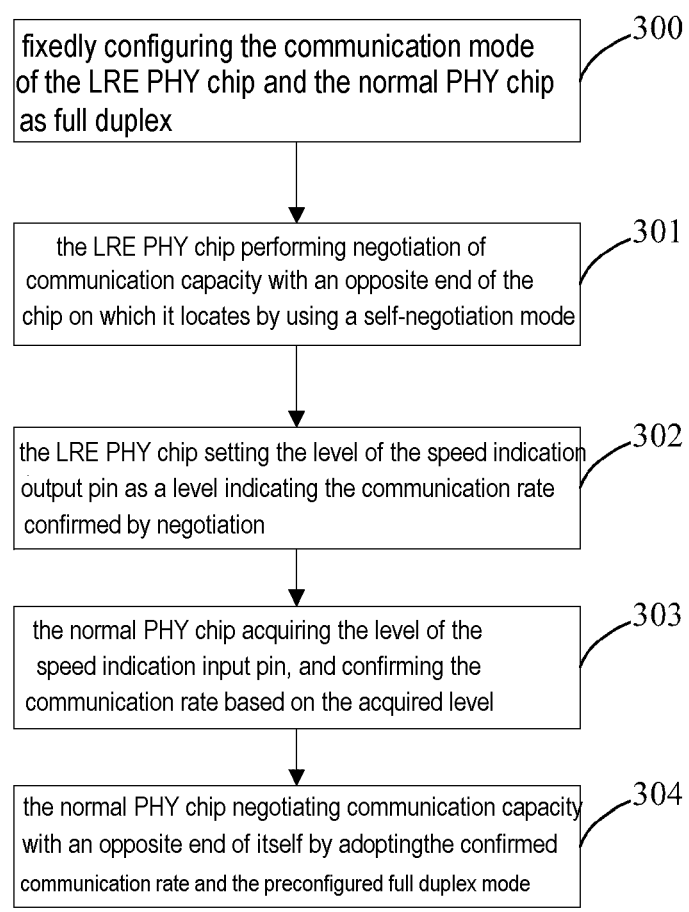
FIG. 3 is a flowchart of the method for communication capacity negotiation of physical layer chips in an example of the principles disclosed herein.

FIG. 3 shows a flowchart of the method for communication capacity negotiation of physical layer chips under the connecting relationship as shown in FIG. 2. The method may be applied to a system constituted by a network device provided with two physical layer chips and two opposite ends in connection with the network device. In this example, the network device is a CPE, and the two physical layer chips are the LRE PHY chip and the normal PHY chip, respectively. As shown in FIG. 3, the method comprises the following steps:

Step 300: fixedly configuring the communication mode of the LRE PHY chip and the normal PHY chip as full duplex.

Step 301: the LRE PHY chip performing self-negotiation of communication capacity with an opposite end of the chip on which it locates by using a self-negotiation protocol of an expanded distance. Wherein, the opposite end of the LRE PHY chip is the physical layer chip of the device connected with the LRE PHY chip via the line to home.

The communication mode by which the LRE PHY chip negotiates with an opposite end is full duplex, which is fixedly configured; and the communication rate of the negotiation is confirmed by negotiation sequentially from the maximum rate.

Step 302: the LRE PHY chip setting the level of its speed indication output pin based on the communication rate confirmed by negotiation, that is, setting the level of its speed indication output pin as a level indicating the communication rate confirmed by negotiation.

Step 303: the normal PHY chip acquiring the level from its speed indication input pin, and confirming the communication rate based on the acquired level.

Step 304: the normal PHY chip negotiating communication capacity with an opposite end by adopting the confirmed communication rate and the preconfigured full duplex mode. Wherein, the opposite end of the normal PHY chip is the physical layer chip of the device connected to the normal PHY chip via the indoor net line. Here, the flow comes to an end.

Figure 4:
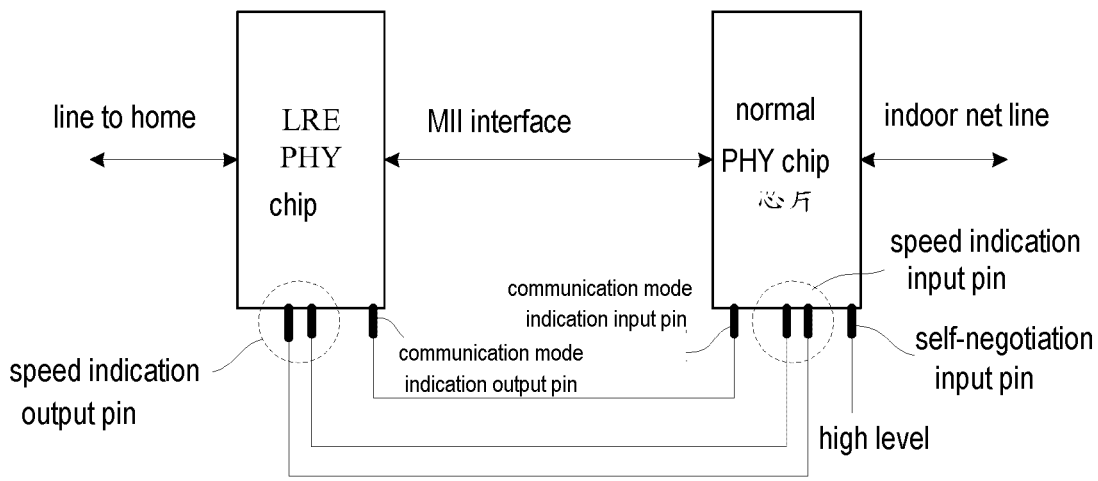
FIG. 4 is a schematic diagram of the connecting structure of the physical layer chips in an example of the principles disclosed herein.

FIG. 4 is a schematic diagram of the connecting structure of the physical layer chips in the CPE in example two of the present invention. As shown in FIG. 4, in this example, the LRE PHY chip and the normal PHY chip support at least 3 communication rates, so two speed indication output pins of the LRE PHY chip are connected with two speed indication input pins of the normal PHY chip, respectively. The LRE PHY chip further comprises a communication mode indication output pin to be connected with the communication mode indication input pin of the normal PHY chip, and the self-negotiation input pin of the normal PHY chip connects the level indicating a fixed negotiation mode.

Figure 5:
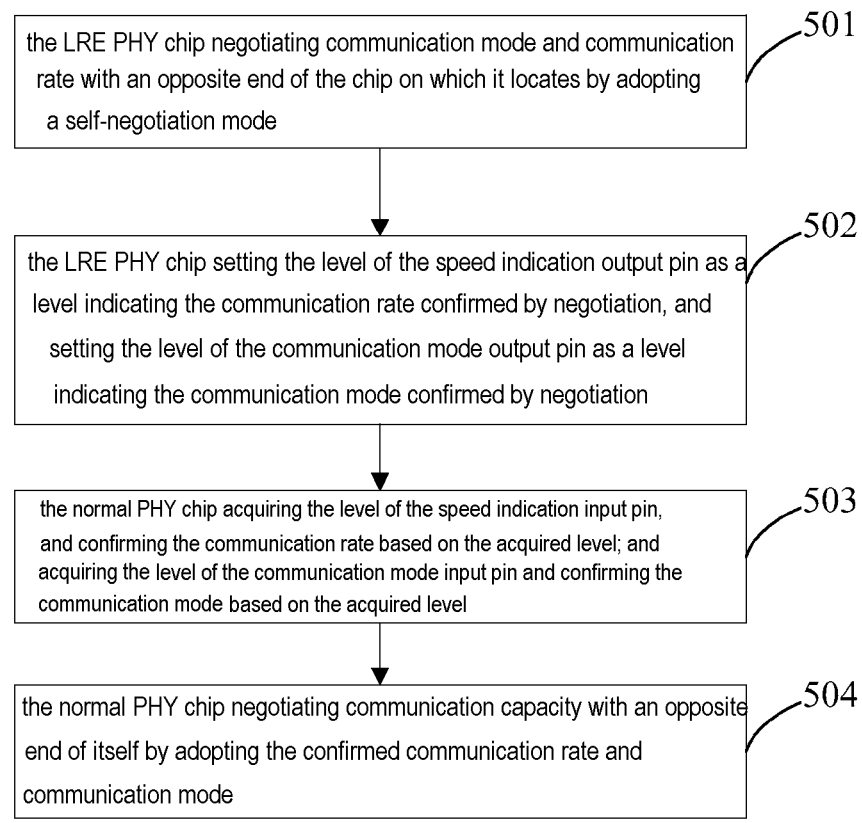
FIG. 5 is a flowchart of the method for communication capacity negotiation of physical layer chips in an example of the principles disclosed herein.

FIG. 5 shows a flowchart of the method for communication capacity negotiation of physical layer chips under the connecting relationship as shown in FIG. 4. The method may be applied to a system constituted by a network device provided with two physical layer chips and two opposite ends in connection with the network device. In this example, the network device is a CPE, and the two physical layer chips are the LRE PHY chip and the normal PHY chip, respectively. As shown in FIG. 5, the method comprises the following steps:

Step 501: the LRE PHY chip negotiating communication mode and communication rate with an opposite end of the chip on which it locates by adopting a self-negotiation mode.

Step 502: the LRE PHY chip setting the level of its speed indication output pin and the communication mode output pin based on the communication mode and communication rate confirmed by negotiation, that is, setting the level of its speed indication output pin as a level indicating the communication rate confirmed by negotiation, and setting the level of its communication mode output pin as a level indicating the communication mode confirmed by negotiation.

Step 503: the normal PHY chip acquiring the level from its speed indication input pin, and confirming the communication rate based on the acquired level; and acquiring the level from its communication mode input pin, and confirming the communication mode based on the acquired level.

Step 504: the normal PHY chip negotiating communication capacity with an opposite end by adopting the confirmed communication rate and communication mode. Here, the flow comes to an end.

In the above two examples, the LRE PHY chip first performs communication capacity negotiation, then notifies the normal PHY chip; in practice, it may also be that the normal PHY chip first performs communication capacity negotiation with an opposite end, then notifies the LRE PHY chip. In the latter case, the normal PHY chip needs to have the speed indication output pin and the communication mode indication output pin. Correspondingly, the LRE PHY chip needs to have the self-negotiation input pin, the speed indication input pin and the communication mode indication input pin. Thus, the normal PHY chip can notify the communication capacity confirmed by negotiation to the LRE PHY chip via the speed indication input pin and the communication mode indication input pin. Likewise, if the LRE PHY chip and the normal PHY chip have already preconfigured the full duplex communication mode, the normal PHY chip only needs to notify the communication rate confirmed by negotiation to the LRE PHY chip via the speed indication input pin.

In the above two examples, the LRE PHY chip and the normal PHY chip are connected through hardware of pins to constitute a notification channel. In practice, the MII interface between the LRE PHY chip and the normal PHY chip can also be used as a notification channel. In this case, when the LRE PHY chip confirms the communication capacity through negotiation, it sends the predefined protocol packet through the MII interface, carries the confirmed communication capacity in the protocol packet and notifies it to the normal PHY chip. The normal PHY chip acquires the communication capacity from the packet upon receipt of the protocol packet, records the acquired communication capacity in a chip register, then the normal PHY chip can perform a fixed negotiation based on the communication capacity recorded in the chip register. However, such notification of communication capacity realized by using the protocol packet calls for an extension MII interface protocol, so the cost of such an implementing mode is higher than the implementing mode of constituting a notification channel by connection of hardware of pins.

The preceding description has been presented only to illustrate and describe embodiments and examples of the principles described. This description is not intended to be exhaustive or to limit these principles to any precise form disclosed. Many modifications and variations are possible in light of the above teaching.

What is claimed:

1. A method for communication capacity negotiation for physical layer chips performed by a network device provided with a first physical layer chip and a second physical layer chip, wherein the first physical layer chip is connected to the second physical layer chip via an interface and a notification channel, said method comprising:

with the first physical layer chip, negotiating a communication capacity with a first device, and reporting the communication capacity confirmed by the negotiation to the second physical layer chip via the notification channel, wherein the notification channel is formed through a connection between a speed indication output pin of the first physical layer chip and a speed indication input pin of the second physical layer chip and is separate from the interface connecting the first physical layer chip and the second physical layer chip; and with the second physical layer chip, adopting the communication capacity acquired from the first physical layer chip to negotiate a communication capacity with a second device.

2. The method of claim 1, wherein negotiating the communication capacity with the first device further comprises negotiating the communication capacity with the first device by one of a fixed negotiation mode and a self-negotiation mode.

3. The method of claim 1, wherein said communication capacity includes communication rate.

4. The method of claim 3, wherein said communication capacity further includes a communication mode.

5. The method of claim 4, further comprising:
connecting a communication mode indication output pin on the first physical layer chip to a communication mode indication input pin on the second physical layer chip.

6. The method of claim 4, wherein the first physical layer chip further includes a communication mode indication output pin, and the second physical layer chip further includes a communication mode indication input pin, and
wherein reporting the communication capacity confirmed by the negotiation to the second physical layer chip further comprises:
setting a level of the communication mode indication output pin of said first physical layer chip at a level indicating the communication mode confirmed by the negotiation; and
with said second physical layer chip, acquiring the level indicating the communication mode from the first physical layer chip at the communication mode indication input pin of said second physical layer chip, and confirming the communication mode based on the acquired level.

7. The method of claim 1, further comprising setting a level of a self-negotiation input pin of the second physical layer chip at a level indicating a fixed negotiation mode.

8. The method of claim 1, wherein reporting the communication capacity confirmed by the negotiation to the second physical layer chip comprises:
setting a level of the speed indication output pin of said first physical layer chip at a level indicating a communication rate confirmed by the negotiation; and
with said second physical layer chip, acquiring the level of the communication rate from the first physical layer chip at the speed indication input pin of said second physical layer chip via the notification channel, and confirming the communication rate based on the acquired level.

9. The method of claim 1, wherein said first physical layer chip is a Long Reach Ethernet LRE physical layer chip, and said second physical layer chip is a normal physical layer chip.

10. The method of claim 1, wherein the notification channel is only used to report the communication capacity from the first physical layer chip to the second physical layer chip.

11. A system for communication capacity negotiation of physical layer chips, comprising:
a first physical layer chip including a speed indication output pin;
a second physical layer chip including a speed indication input pin; and
an interface connecting the first physical layer chip to the second physical layer chip,
wherein the speed indication output pin of the first physical layer chip is connected to the speed indication input pin of the second physical layer chip to form a notification channel,
wherein the notification channel is different from the interface connecting the first physical layer chip and the second physical layer chip,
wherein said first physical layer chip is to negotiate a communication capacity with a first device, and report the communication capacity confirmed by the negotiation to said second physical layer chip via the notification channel; and
wherein said second physical layer chip is to adopt the communication capacity acquired from said first physical layer chip to negotiate a communication capacity with a second device.

12. The system of claim 11, wherein said first physical layer chip is to negotiate the communication capacity with the first device by one of a fixed negotiation mode and a self-negotiation mode.

13. The system of claim 11, wherein said communication capacity includes a communication rate.

14. The system of claim 13, wherein said communication capacity further includes a communication mode.

15. The system of claim 14, wherein:
said first physical layer chip further comprises a communication mode indication output pin and said second physical layer chip further comprises a communication mode indication input pin;
said communication mode indication output pin being connected with said communication mode indication input pin.

16. The system of claim 15, wherein:
said communication mode indication output pin of the first physical layer chip is set at a level indicating the communication mode after the negotiation of the communication capacity; and
said second physical layer chip is to receive the level indicating the communication mode at the communication mode indication input pin.

17. The system of claim 11, wherein:
said second physical layer chip further includes a self-negotiation input pin; and
wherein a level of the self-negotiation input pin is set at a level indicating a self-negotiation mode.

18. The system of claim 11, wherein:
said second physical layer chip includes a self-negotiation input pin; and
a level of said self-negotiation input pin is set at a level indicating a fixed negotiation mode.

19. The system of claim 11, wherein:
the speed indication output pin of the first physical layer chip is set at a level indicating a communication rate after the negotiation of the communication capacity; and said second physical layer chip is to receive the level indicating the communication rate from the second physical layer chip via the notification channel.

20. The system of claim 11, wherein the notification channel is only used to report the communication capacity from the first physical layer chip to the second physical layer chip.

* * * * *